3,049,496
PROPARGYL COMPOUNDS AS CORROSION INHIBITORS

Roger F. Monroe and Fred J. Lowes, Midland, Mich., and Gerald L. Foster and Billy D. Oakes, Tulsa, Okla., assignors to The Dow Chemical Company, Midland, Mich., a corporation of Delaware
No Drawing. Filed Apr. 30, 1959, Ser. No. 809,902
3 Claims. (Cl. 252—146)

This invention relates to corrosion inhibitors for use in aqueous, non-oxidizing acids to inhibit the corrosion of iron, steel, nickel and ferrous alloys by such acids.

The corrosion inhibitors of this invention are the propargyl compounds corresponding to the formula $$HO-\underset{R'}{\overset{R}{C}}-C\equiv CH$$

wherein R is —H, alkyl or phenyl and R' is —H or lower alkyl.

According to the invention, a propargyl compound corresponding to the above formula is dissolved in the aqueous acid the corrosive action of which is to be inhibited. By "aqueous acid" we mean any composition comprising a non-oxidizing acid and water and do not mean to exclude the presence of other substances. By "lower alkyl" we mean alkyl radicals containing not more than four carbon atoms.

Only a small amount of the inhibitor is needed. As little as a few thousandths of 1 percent, based on the aqueous acid, significantly reduces the corrosion of iron, steel or nickel exposed to the acid. The degree of inhibition increases with the concentration of the inhibitor up to a level of about 1 percent. Beyond this point little added protection of the metal is obtained by the use of more inhibitor. We generally prefer to use our inhibitors at a level of about 0.1 to 0.4 percent, this amount being adequate for most purposes.

The inhibitors of the invention are effective not only at ordinary temperatures but also at elevated temperatures up to the decomposition point of the inhibitors. All are effective at 150° and some at 200° F. Moreover, they are effective in various concentrations of acids, even including hydrochloric acid up to 37 percent, that is, commercial concentrated acid.

Applications in which the inhibitors are particularly useful include metal-pickling, cleaning and polishing baths, oil well-acidizing solutions, boiler-cleaning compositions and the like.

The inhibitors of this invention are either commercially available or are easily made from commercially available intermediates.

The propargyl and substituted propargyl alcohols are easily prepared from acetylene and the appropriate carbonyl compound by well known methods, such as that of Froning and Hennion, J. Am. Chem. Soc., 62, 653 (1940).

In order to demonstrate the effectiveness of our inhibitors a series of tests was run in which 0.4 percent of the inhibitor was put into a 10 percent aqueous solution of hydrochloric acid held at 150° F. and a coupon of the metal to be tested was suspended in the solution for 16 hours. Thereafter the coupon was cleaned, dried and weighed to determine the amount of metal dissolved by the acid. The results obtained in a series of such tests in which AISI–1020 mild steel was used are shown in the following table.

Table I

Corrosion of mild steel by 10 percent HCl in the presence of 0.4 percent of an inhibitor having the formula $$HO-\underset{R'}{\overset{R}{C}}-C\equiv CH$$

| Example No. | R | R' | Corrosion, lb./sq. ft./day | |
|---|---|---|---|---|
| | | | 150° F. | 175° F. |
| 1 | (CH₂)₅H | CH₃ | 0.0017 | 0.034 |
| 2 | H | H | .0029 | .011 |
| 3 | CH₃ | CH₃ | .0033 | >1 |
| 4 | 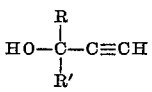 | H | .0059 | .0061 |
| 5 | C₂H₅ | CH₃ | .036 | -------- |
| 6 | C₆H₅ | H | .146 | -------- |
| 7 | (no inhibitor) | | >1 | -------- |

1-(2,4,6-trimethyl-3-cyclohexenyl)-3-propyne-1-ol (Example 4) was highly effective in 10 percent HCl at 200° F. and in 15 percent HCl at 175° (corrosion rates, 0.0052 and 0.013, respectively) but failed in 15 percent HCl at 200°. In general, the upper temperature limit of the inhibitors is inversely related to the concentration of the HCl in which they are used.

Homologs of the compounds in Table I wherein R and R' may contain up to at least four carbon atoms are also effective corrosion inhibitors.

Results generally paralleling those shown in Table I were obtained when similar tests were run at lower temperatures, with lower or higher concentrations of HCl, or with other ferrous metals or nickel as the test metal. Likewise, other non-oxidizing acids, such as phosphoric, sulfuric and acetic acids are similarly inhibited.

This application is a continuation-in-part of our earlier filed application, Serial No. 604,315, filed August 16, 1956, now abandoned.

We claim:
1. An aqueous solution of a non-oxidizing acid containing as a corrosion inhibitor an effective amount of 1-(2,4,6-trimethyl-3-cyclohexenyl)-3-propyne-1-ol.
2. A solution as defined in claim 1 wherein the concentration of the inhibitor is about 0.1 to 1 percent, by weight.
3. A process for inhibiting the corrosive action of an aqueous solution of a non-oxidizing acid on a metal of the group consisting of iron, steel, nickel and ferrous alloys comprising maintaining in said solution, while said solution is in contact with said metal, an effective concentration of 1-(2,4,6-trimethyl-3-cyclohexenyl)-3-propyne-1-ol.

References Cited in the file of this patent

UNITED STATES PATENTS

| 1,877,504 | Grebe et al. | Sept. 13, 1932 |
| 2,603,622 | Berger et al. | July 15, 1952 |
| 2,806,067 | Monroe et al. | Sept. 10, 1957 |
| 2,913,408 | Pumpelly et al. | Nov. 17, 1959 |

FOREIGN PATENTS

| 235,291 | Switzerland | Apr. 3, 1945 |
| 468,231 | Italy | Dec. 29, 1951 |